United States Patent [19]
Miyano

[11] Patent Number: 5,850,381
[45] Date of Patent: *Dec. 15, 1998

[54] METHOD OF RECORDING INFORMATION ON A DISC BY RECORDING INFORMATION AT INTERLEAVED SECTORS

[75] Inventor: Yuichi Miyano, Kanagawa-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 618,107

[22] Filed: Mar. 19, 1996

Related U.S. Application Data

[63] Continuation of Ser. No. 314,267, Sep. 30, 1994, abandoned.

[30] Foreign Application Priority Data

Sep. 30, 1993 [JP] Japan ..................................... 5-244096

[51] Int. Cl.⁶ ....................................................... G11B 7/00
[52] U.S. Cl. ........................................ 369/111; 369/275.3
[58] Field of Search .................................. 369/47–48, 50, 369/111, 275.1, 275.3, 275.4; 360/48, 77.03, 77.08, 78.04, 135

[56] References Cited

U.S. PATENT DOCUMENTS

| | | |
|---|---|---|
| 4,161,753 | 7/1979 | Bailey et al. . |
| 5,412,629 | 5/1995 | Shirane ....................................... 369/32 |
| 5,425,014 | 6/1995 | Tsuyuguchi et al. ....................... 369/48 |

FOREIGN PATENT DOCUMENTS

| | | |
|---|---|---|
| 418858 | 3/1991 | European Pat. Off. . |
| 437202 | 7/1991 | European Pat. Off. . |
| 4254967 | 9/1992 | Japan . |

OTHER PUBLICATIONS

Patent Abstracts of Japan, vol. 17, No. 36, p. 1474, 22 Jan. 1993, & JP–A–04 254 967.

*Primary Examiner*—W. R. Young
*Attorney, Agent, or Firm*—Cushman Darby & Cushman IP Group of Pillsbury Madison & Sutro LLP

[57] ABSTRACT

A disc shaped data recording medium adapted for recording/reproducing information data in a medium adapted for recording/reproducing information data in accordance with a modified constant angular velocity system and having sectors allocated in an interleaving manner which is adjusted in accordance with a track location along the radius of the disc shaped data recording medium. By allocating the sectors in this fashion, the data rate of the data recorded on the medium can be unified over the data recording medium from its innermost track to its outermost track.

30 Claims, 3 Drawing Sheets

METHOD OF RECORDING INFORMATION ON A DISC BY RECORDING INFORMATION AT INTERLEAVED SECTORS

This is a continuation of application Ser. No. 08/314,267, filed on Sep. 30, 1994, which was abandoned.

FIELD OF THE INVENTION

The present invention relates to a disc shape data recording medium, and more particularly, to a formatting system for a disc shape data recording medium.

BACKGROUND OF THE INVENTION

Recently, a constant velocity control system (e.g., a CAV system) has been used for disc medium, such as optical discs and magnetic discs, and for data recording apparatus using such disc medium due to an advantage of their increased data access speeds. However, a conventional CAV system has a problem in that it is difficult to unify the data recording density along a line direction over the recording medium due to the track length difference between the inner record area and the outer record area.

In recent years, as uses of such disc shaped medium and disc apparatus are expected to expand, there is a demand to increase the recording capacity of the disc medium. A way of increasing the recording density at the outer record area similar to the recording density at the inner record area will advantageously improve the data recording capacity. Thus, there are many proposals for reducing the difference of the recording densities between the inner record area and the outer record area. These methods are generally called a zone-bit recording system, a zone-split CAV system or an MCAV (Modified CAV) system.

Referring now to FIG. 1, an example of conventional disc formats according to such systems will be described. In this example, the data recording area is split into four zones Ma–Md from the innermost record track A to the outermost record track B along the disc radius. Thus, each of the four zones includes one or more data recording tracks. Further, each track is split into sectors along its longitudinal direction where the sectors are treated as a minimum unit of recording/reproducing operation.

The number of sectors per track for the four zones are 7, 13, 19 and 25 from the inner zone Ma to the outer zone Md of the disc, respectively. At a constant rotation speed, the data rate ratios of information on the four zones become equal to the sector ratios. Therefore, the data rate of information on the outermost disc zone Md becomes about 3.6 times that of the innermost disc zone Ma.

FIG. 2 is a graph showing data rate changes of information in an exemplified conventional MCAV system disc format. The Y-coordinate represents an amount of read/write data [Sectors], while the X-coordinate represents a rotating angle [Rad.] of a disc. Because there is a large difference between the data rate of information on the innermost track A, as indicated by the solid line, and that of the outermost track B, as indicated by the broken line, a circuit design must meet the higher one of the data rates of information. Accordingly, there was a problem in that a large scale circuit was required and the controls of the circuits were complicated. Thus, increasing the difference between the data rates of information of the inner disc zone Ma and the outer disc zone Mb of a disc complicates control of the data writing/reading operations. Thus, the conventional disc format is not suited for real-time information processing of data such as motion picture, sound, etc. Further, there was also a problem that when a relatively small amount of data was intermittently read/written, or a buffer capacity was small, there was a frequent standby time for rotation which interfered with improving the access speed.

To solve the problems involved in the MCAV disc as described above, a conventional disc apparatus as disclosed in the Japanese Patent Application, Tokkai-Hei 4-254967 has been proposed. FIG. 3 is a schematic diagram showing a conventional disc apparatus as disclosed in Tokkai-Hei 4-254967. This conventional disc apparatus is comprised of a motor 62 for driving a disc 61 by supporting its center on the motor spindle, optical heads 63 and 64 for recording/reproducing data on or from the disc 61, a combiner 65 for combining signals obtained by the optical heads 63 and 64, a distributor 66 for distributing its input signal to the optical heads 63 and 64, an interface (I/F) circuit 67 for interfacing input/output signals to the distributor 66 or from the combiner 65, a judging circuit 68 for switching the combiner 65 and the distributor 66 in accordance with a direction information from the I/F circuit 67 and a host computer 69 for controlling the I/F circuit 67.

According to the conventional apparatus of the Japanese Patent Application as described above, in a reproducing operation, the combiner 65 combines two recorded data reproduced at different transfer rates by the optical heads 63 and 64, respectively, and then outputs the combined data at a prescribed constant transfer rate. Further, in a recording operation, the distributor 66 distributes two recording data transferred thereto at the constant transfer rate to the optical heads 63 and 64 in accordance with the ratio of transfer rates adapted for the optical heads 63 and 64.

However, the above described conventional apparatus still has a problem in that there is an increased overhead of the rotation required for distributing and combining data. Furthermore, the apparatus has another problem in that it is difficult to reduce the size and the cost thereof because it requires a plurality of components for the optical heads and the peripheral equipment for driving the optical heads.

As described above, conventional data recording medium have disadvantages such as, when a relatively small amount of data was intermittently read/written or a buffer capacity was small, there was frequent standby time for rotation which interferes with improving access speed. Further, the conventional data recording apparatus having a plurality of heads have another disadvantage of having an increased overhead of the rotation required for distributing and combining data.

SUMMARY OF THE INVENTION

Accordingly, it is an object of the present invention to provide a data recording medium which does not have the defects or disadvantages as described above.

Another object of the present invention is to provide a data recording medium which can cope with moving pictures, etc. by unifying data rates of information on the inner disc area and the outer disc area of the MCAV system discs.

In order to achieve the above object, a data recording medium according to one aspect of the present invention includes sectors allocated in an interleaving manner which is adjusted in accordance with a track location along the radius of the disc shaped data recording medium so that the data rate of the data recorded on the medium is unified over the data recording medium from its innermost track to its outermost track.

According to the data recording medium having such a construction as described above, it is possible to unify data rates of information over the overall surface of the data recording medium by allocating sectors of recording data on the medium in the interleaving manner which is adjusted in accordance with the track locations along the radius of the disc shaped data recording medium.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

A preferred embodiment of the present invention will be described in detail with reference to the drawings FIG. 4 through 6.

Figure 4:
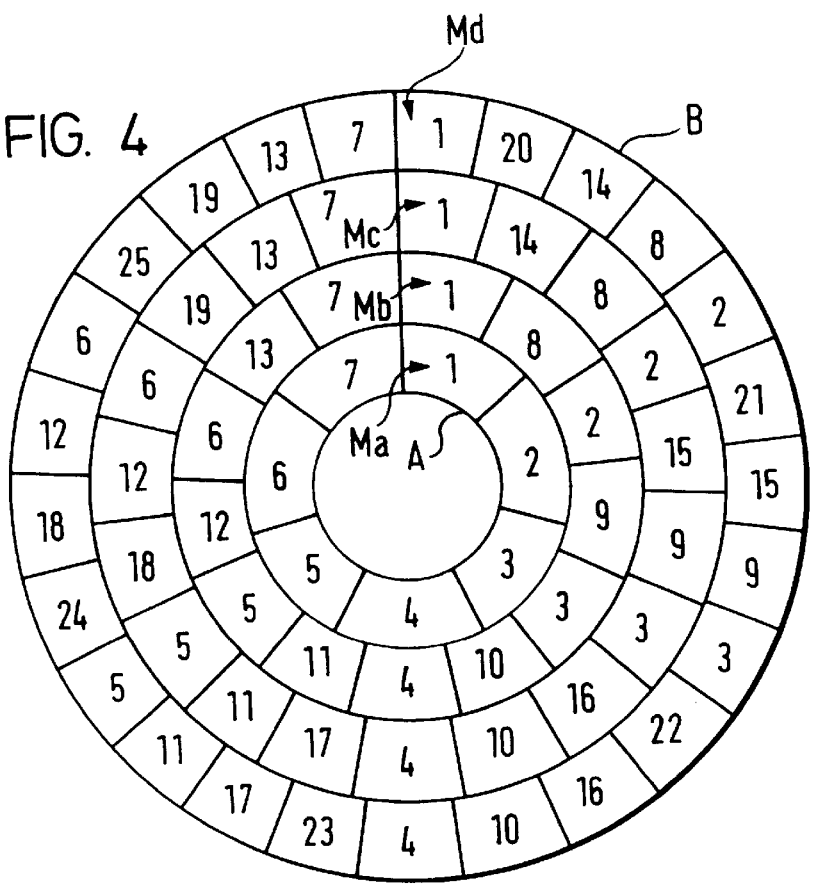
FIG. 4 is a schematic diagram showing one embodiment of the disc format for the data recording medium according to the present invention.

FIG. 4 is a schematic diagram showing a preferred embodiment of disc format for a data recording medium according to the present invention. Data is recorded on the disc in accordance with the so-called MCAV (Modified Angular Velocity) system. The MCAV system is a system which is improved for removing the defects of the CAV system that the recording capacity of the CAV system is relatively small, but leaving the advantage of the CAV system that the control of CAV system rotation is very easy. The rotation speed is kept constant over the whole surface extending from the inner disc area to the outer disc area of the disc. While the recording/reproducing frequency increases in stages from the inner disc area to the outer disc area, the length of sectors also changes in stages. Further, the laser power for optically recording/reproducing data on the disc medium also gradually increases from the inner disc area to the outer disc area.

FIG. 4 shows an example where the data recording area ranging from the innermost track A to the outermost track B is divided into four zones Ma through Md. Each of the zones has one or more data recording tracks. Further, each of the tracks is divided into a plurality of sectors, each having a prescribed capacity unit for recording data, along its longitudinal direction where the sectors act as the minimum unit of recording/reproducing data.

The amount of sectors per track in the zones Ma through Md radially aligned from the inner disc area to the outer disc area are 7, 13, 19 and 25, respectively. Here, the sectors are distributed on the track in an interleaved manner of leaving spaces which are differentiated in response to the location of respective tracks. FIG. 4 shows such an interleaved sector distribution wherein the sectors of the zones Ma through Md are interleaved by 0, 1, 2 and 3 sectors, respectively, along the direction from the innermost zone to the outermost zone.

Figure 5:
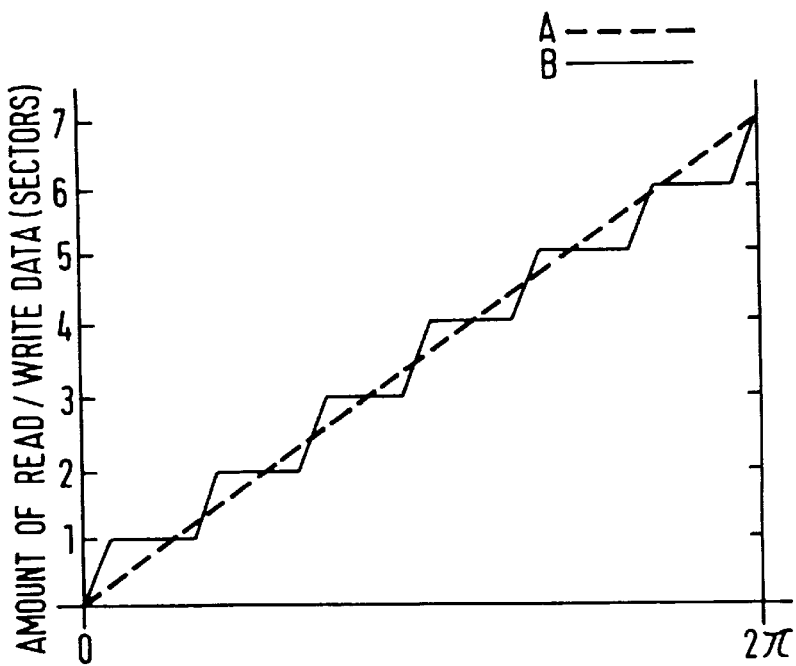
FIG. 5 is a graph for illustrating data rate changes of information in the embodiment of FIG. 4.

FIG. 5 is a graph showing data rate changes of information in the data recording/reproducing operation on or from the data recording medium according to the embodiment, as shown in FIG. 4. The Y-coordinate represents an amount of read/write data [Sectors], while the X-coordinate represents a rotating angle [Rad.] of a disc. In FIG. 5 the broken line represents a data rate change of information on the innermost track A of the disc, while the solid line represents the data rate change of information on the outermost track B of the disc. As seen from the graph, the data rate of information on the outermost track B closely follows the data rate of information on the innermost track A.

Figure 1:
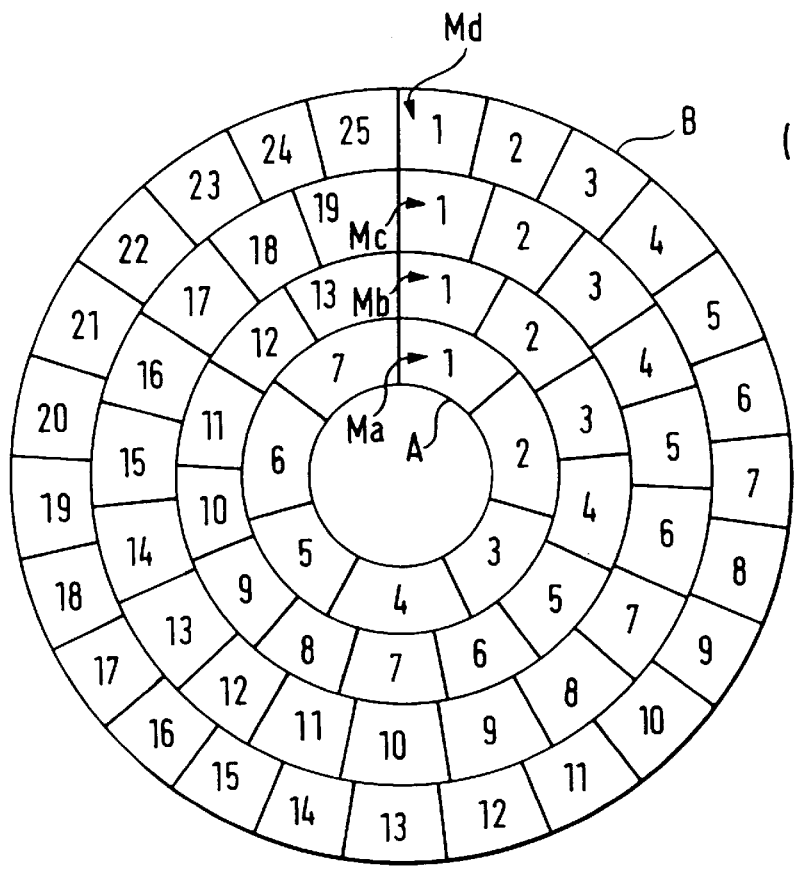
FIG. 1 is a schematic diagram showing a conventional MCAV system disc format.
Figure 2:
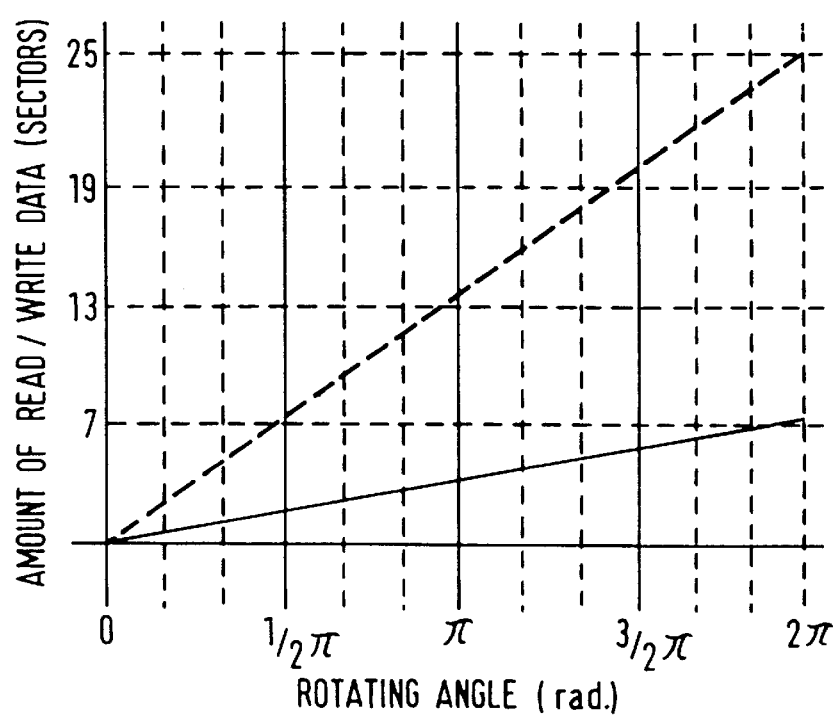
FIG. 2 is a graph showing data rate changes of information in the conventional MCAV system disc format of FIG. 1.
Figure 6:
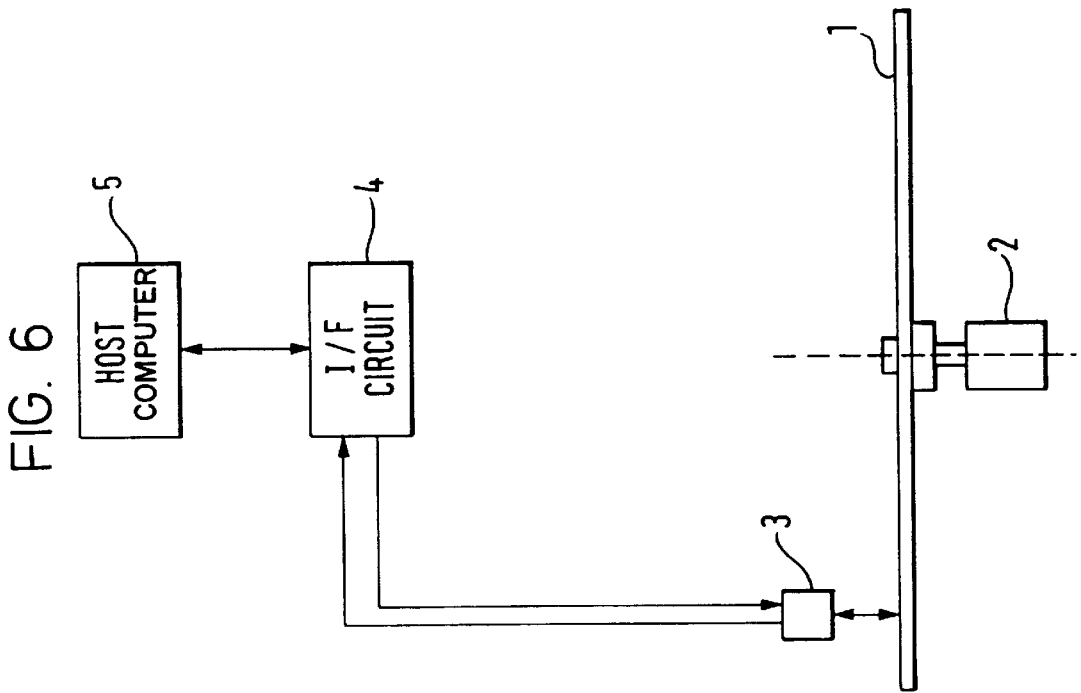
FIG. 6 is a schematic diagram of a disc apparatus adapted for the disc format in the embodiment of FIG. 4.
Figure 3:
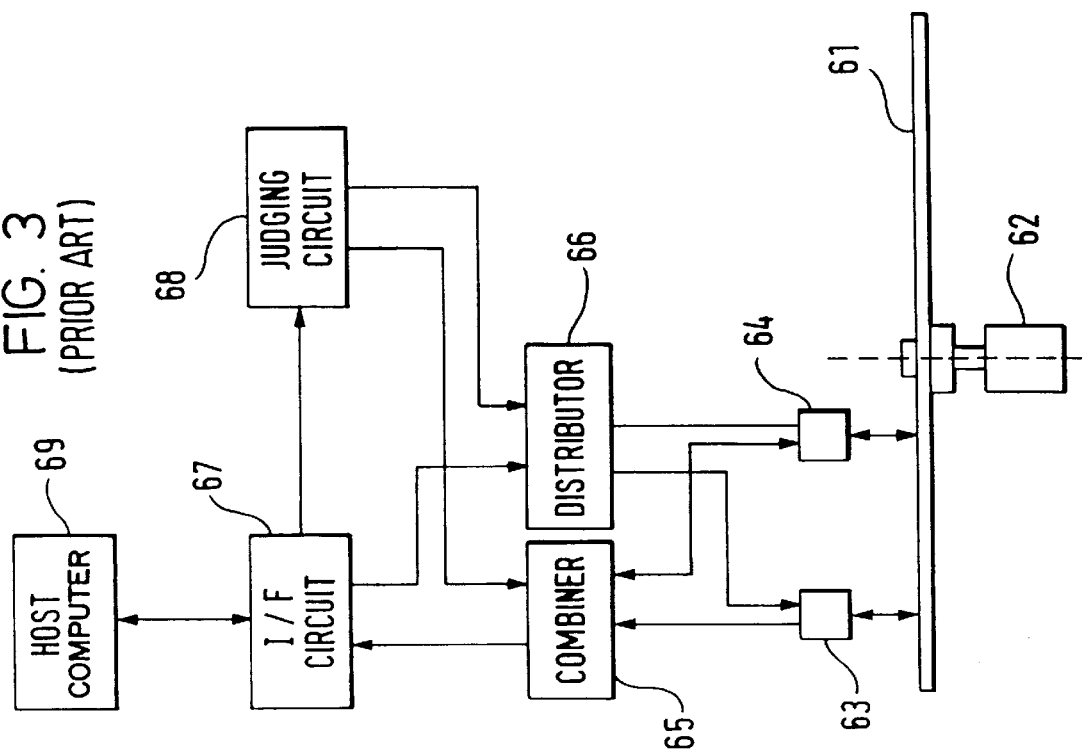
FIG. 3 is a schematic diagram showing a conventional disc apparatus associated with the disc format of FIG. 1.

FIG. 6 is a schematic diagram showing the embodiment of the disc apparatus according to the present invention. The disc apparatus is comprised of a motor 2 for driving a disc 1 by supporting its center on the motor spindle, an optical head 3 for recording/reproducing data on or from the disc 1, an I/F circuit 4 for interfacing input/output signals to the optical head 3 and a host computer 5 for controlling the I/F circuit 4.

By using the disc format of the present invention, as shown in FIG. 4, the disc apparatus adapted for the disc format can record or reproduce data at a unified data rate of information almost all over the disc surface.

As described above, the present invention can unify the data rate for recording/reproducing data on the inner area and the outer area of the disc by distributing sectors on the track in an interleaved manner of leaving spaces which are differentiated in response to the location of respective tracks.

As described above, the present invention can provide an extremely preferable data recording medium.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A disc-shaped data medium adapted for recording information data according to a modified constant angular velocity system, wherein:
   a plurality of zones are allocated along a radius of the medium;
   a plurality of tracks are allocated along the radius of the medium for each zone;
   a plurality of sectors are allocated for each track, the sectors having angular arcuate lengths according to respective zone locations; and
   wherein, the sectors are interleaved by positioning sequential sectors of consecutively ordered information data according to respective zone locations so that the number of sectors between sequential sectors of consecutively ordered information data increases from an innermost zone to an outermost zone.

2. A disc-shaped data medium adapted for reproducing information data according to a modified constant angular velocity system, wherein:
   a plurality of zones are allocated along a radius of the medium;
   a plurality of tracks are allocated along the radius of the medium for each zone;
   a plurality of sectors are allocated for each track, the sectors having angular arcuate lengths according to respective zone locations; and
   wherein, the sectors are interleaved by positioning sequential sectors of consecutively ordered information data according to respective zone locations so that the number of sectors between sequential sectors of consecutively ordered information data increases from an innermost zone to an outermost zone.

3. A method of recording data on a disc-shaped data medium according to a modified constant angular velocity system comprising:
   allocating a plurality of zones along a radius of the medium;
   allocating a plurality of tracks for each zone; and
   allocating a plurality of sectors for each track so that the sectors have angular arcuate lengths according to respective zone locations; and
   interleaving the sectors by positioning sequential sectors of consecutively ordered information data according to respective zone locations so that the number of sectors between sequential sectors of consecutively ordered data increases from an innermost zone to an outermost zone.

4. A method of reproducing data on a disc-shaped data medium according to a modified constant angular velocity system comprising:
   allocating a plurality of zones along a radius of the medium;
   allocating a plurality of tracks for each zone; and
   allocating a plurality of sectors for each track so that the sectors have angular arcuate lengths according to respective zone locations;
   interleaving the sectors by positioning sequential sectors of consecutively ordered information data according to respective zone locations so that the number of sectors between sequential sectors of consecutively ordered data increases from an innermost zone to an outermost zone; and
   reproducing the data from the medium so that the number of sequential sectors of consecutively ordered data reproduced per revolution of the medium is substantially unified from an innermost track to an outermost track.

5. A modified constant angular velocity system for recording data on a disc-shaped data medium comprising:
   a motor to rotate the medium at a constant angular velocity;
   a recording head positioned to record information data on a surface of the medium;
   a computer, the computer being operable to control recording of data by the recording head on the medium; and
   wherein data is recorded on the medium using a format comprising:
      a plurality of zones allocated along a radius of the medium;
      a plurality of tracks allocated along the radius of the medium for each zone;
      a plurality of sectors allocated for each track, the sectors having angular arcuate lengths according to respective zone locations; and
      the sectors are interleaved by positioning sequential sectors of consecutively ordered data according to respective zone locations so that the number of sectors between sequential sectors of consecutively ordered data increases from an innermost zone to an outermost zone.

6. The system as in claim 6, wherein:
   the recording head is an optical recording head.

7. A modified constant angular velocity system for recording data on a disc-shaped data medium comprising:
   rotating means for rotating the medium at a constant angular velocity;
   recording means for recording data on a surface of the medium;
   record controlling means for controlling the recording means; and
   wherein data is recorded on the medium using a format comprising:
      a plurality of zones allocated along a radius of the medium;
      a plurality of tracks allocated along the radius of the medium for each zone;
      a plurality of sectors allocated for each track, the sectors having angular arcuate lengths according to respective zone locations; and
      the sectors are interleaved by positioning sequential sectors of consecutively ordered data according to respective zone locations so that the number of sectors between sequential sectors of consecutively ordered data increases from an innermost zone to an outermost zone.

8. The system as in claim 7, wherein:
   the recording means is an optical recording head.

9. A modified constant angular velocity system for reproducing data on a disc-shaped data medium comprising:
   a motor to rotate the medium at a constant angular velocity;
   a reproducing head positioned to reproduce data from a surface of the medium;
   a computer, the computer being operable to control the reproducing of data by the reproducing head from the medium;
   wherein the format of the medium comprises:
      a plurality of zones allocated along a radius of the medium, a plurality of tracks allocated along the radius of the medium for each zone, a plurality of sectors allocated for each track, the sectors having angular arcuate lengths according to respective zone locations, and the sectors are interleaved by positioning sequential sectors of consecutively ordered data according to respective zone locations so that the number of sectors between sequential sectors of consecutively ordered data increases from an innermost zone to an outermost zone; and wherein the number of sequential sectors of consecutively ordered data reproduced per revolution of the medium is substantially unified from an innermost track to an outermost track.

10. The system as in claim 9, wherein:

the reproducing head is an optical reproducing head.

11. A modified constant angular velocity system for reproducing information data from a disc-shaped data medium comprising:

rotating means for rotating the medium at a constant angular velocity;

reproducing means for reproducing information data from a surface of the medium;

reproduction controlling means for controlling reproduction of information data by the reproducing means; and wherein the format of the medium comprises:

a plurality of zones allocated along a radius of the medium, a plurality of tracks allocated along the radius of the medium for each zone;

a plurality of sectors allocated for each track, the sectors having angular arcuate lengths according to respective zone locations, and the sectors are interleaved by positioning sequential sectors of consecutively ordered information data according to respective zone locations so that the number of sectors between sequential sectors of consecutively ordered data increases from an innermost zone to an outermost zone; and wherein the number of sequential sectors of consecutively ordered data reproduced per revolution of the medium is substantially unified from an innermost track to an outermost track.

12. The system as in claim 11, wherein:

the reproducing means is an optical reproducing head.

13. A disc-shaped data medium adapted for recording information data according to a modified constant angular velocity system, wherein:

a plurality of zones are allocated along a radius of the medium;

a plurality of tracks are allocated along the radius of the medium for each zone;

a plurality of sectors are allocated for each track, the sectors having angular arcuate lengths according to respective zone locations; and wherein, the sectors are interleaved by positioning sequential sectors of consecutively ordered information data according to respective zone locations so that the arcuate angle between the start of each sequential sector of consecutively ordered information data and the start of a next sequential sector of consecutively ordered information data is substantially uniform from an innermost zone to an outermost zone.

14. A disc-shaped data medium adapted for reproducing information data according to a modified constant angular velocity system, wherein:

a plurality of zones are allocated along a radius of the medium;

a plurality of tracks are allocated along the radius of the medium for each zone;

a plurality of sectors are allocated for each track, the sectors having angular arcuate lengths according to respective zone locations; and wherein, the sectors are interleaved by positioning sequential sectors of consecutively ordered information data according to respective zone locations so that the arcuate angle between the start of each sequential sector of consecutively ordered information data and the start of a next sequential sector of consecutively ordered information data is substantially uniform from an innermost zone to an outermost zone.

15. A method of recording data on a disc-shaped data medium according to a modified constant angular velocity system comprising:

allocating a plurality of zones along a radius of the medium;

allocating a plurality of tracks for each zone; and allocating a plurality of sectors for each track so that the sectors have angular arcuate lengths according to respective zone locations; and interleaving the sectors by positioning sequential sectors of consecutively ordered information data according to respective zone locations so that the arcuate angle between the start of each sequential sector of consecutively ordered data and the start of a next sequential sector of consecutively ordered data is substantially uniform from an innermost zone to an outermost zone.

16. The recording method of claim 15, further comprising:

recording the data so that the number of sequential sectors of consecutively ordered data recorded per revolution of the medium is substantially unified from an innermost track to an outermost track.

17. A method of reproducing data on a disc-shaped data medium according to a modified constant angular velocity system comprising:

allocating a plurality of zones along a radius of the medium;

allocating a plurality of tracks for each zone; and allocating a plurality of sectors for each track so that the sectors have angular arcuate lengths according to respective zone locations;

interleaving the sectors by positioning sequential sectors of consecutively ordered data according to respective zone locations so that the arcuate angle between the start of each sequential sector of consecutively ordered data and the start of a next sequential sector of consecutively ordered data is substantially uniform from an innermost zone to an outermost zone; and reproducing the data from the medium so that the number of sequential sectors of consecutively ordered data reproduced per revolution of the medium is substantially unified from an innermost track to an outermost track.

18. A modified constant angular velocity system for recording data on a disc-shaped data medium comprising:

a motor to rotate the medium at a constant angular velocity;

a recording head positioned to record information data on a surface of the medium;

a computer, the computer being operable to control recording of data by the recording head on the medium; and wherein data is recorded on the medium using a format comprising:

a plurality of zones allocated along a radius of the medium;

a plurality of tracks allocated along the radius of the medium for each zone;

a plurality of sectors allocated for each track, the sectors having angular arcuate lengths according to respective zone locations; and the sectors are interleaved by positioning sequential sectors of consecutively ordered data according to respective zone locations so that the arcuate angle between the start of each sequential sector of consecutively ordered data and the start of a next sequential sector of consecutively ordered data is substantially uniform from an innermost zone to an outermost zone.

19. The system of claim 18, wherein:

the recording head is an optical recording head.

20. The system of claim 18, wherein:

the number of sequential sectors of consecutively ordered data recorded per revolution of the medium is substantially unified from an innermost track to an outermost track.

21. A modified constant angular velocity system for recording data on a disc-shaped data medium comprising:

rotating means for rotating the medium at a constant angular velocity;

recording means for recording data on a surface of the medium;

record controlling means for controlling the recording means; and wherein data is recorded on the medium using a format comprising:

a plurality of zones allocated along a radius of the medium;

a plurality of tracks allocated along the radius of the medium for each zone;

a plurality of sectors allocated for each track, the sectors having angular arcuate lengths according to respective zone locations; and the sectors are interleaved by positioning sequential sectors of consecutively ordered data according to respective zone locations so that the arcuate angle between the start of each sequential sector of consecutively ordered data and the start of a next sequential sector of consecutively ordered data is substantially uniform from an innermost zone to an outermost zone.

22. The system as in claim 21, wherein:

the recording means is an optical recording head.

23. The system of claim 21, wherein:

the number of sequential sectors of consecutively ordered data recorded per revolution of the medium is substantially unified from an innermost track to an outermost track.

24. A modified constant angular velocity system for reproducing data on a disc-shaped data medium comprising:

a motor to rotate the medium at a constant angular velocity;

a reproducing head positioned to reproduce data from a surface of the medium;

a computer, the computer being operable to control the reproducing of data by the reproducing head from the medium;

wherein the format of the medium comprises:

a plurality of zones allocated along a radius of the medium, a plurality of tracks allocated along the radius of the medium for each zone, a plurality of sectors allocated for each track, the sectors having angular arcuate lengths according to respective zone locations, and the sectors are interleaved by positioning sequential sectors of consecutively ordered data according to respective zone locations so that the arcuate angle between the start of each sequential sector of consecutively ordered data and the start of a next sequential sector of consecutively ordered data is substantially uniform from an innermost zone to an outermost zone; and wherein the number of sequential sectors of consecutively ordered data reproduced per revolution of the medium is substantially unified from an innermost track to an outermost track.

25. The system as in claim 24, wherein:

the reproducing head is an optical reproducing head.

26. A modified constant angular velocity system for reproducing information data from a disc-shaped data medium comprising:

rotating means for rotating the medium at a constant angular velocity;

reproducing means for reproducing information data from a surface of the medium;

reproduction controlling means for controlling reproduction of information data by the reproducing means; and wherein the format of the medium comprises:

a plurality of zones allocated along a radius of the medium, a plurality of tracks allocated along the radius of the medium for each zone;

a plurality of sectors allocated for each track, the sectors having angular arcuate lengths according to respective zone locations, and the sectors are interleaved by positioning sequential sectors of consecutively ordered information data according to respective zone locations so that the arcuate angle between the start of each sequential sector of consecutively ordered data and the start of a next sequential sector of consecutively ordered data is substantially uniform from an innermost zone to an outermost zone; and wherein the number of sequential sectors of consecutively ordered data reproduced per revolution of the medium is substantially unified from an innermost track to an outermost track.

27. The system as in claim 26, wherein:

the reproducing means is an optical reproducing head.

28. The recording method of claim 3, further comprising:

recording the data so that the number of sequential sectors of consecutively ordered data recorded per revolution of the medium is substantially unified from an innermost track to an outermost track.

29. The system of claim 5, wherein:

the number of sequential sectors of consecutively ordered data recorded per revolution of the medium is substantially unified from an innermost track to an outermost track.

30. The system of claim 7, wherein:

the number of sequential sectors of consecutively ordered data recorded per revolution of the medium is substantially unified from an innermost track to an outermost track.

* * * * *